US012358161B2

United States Patent
Xiao et al.

(10) Patent No.: US 12,358,161 B2
(45) Date of Patent: Jul. 15, 2025

(54) JOINT MODULE AND ARTICULATED ROBOT

(71) Applicant: Shenzhen Han's Robot Co., Ltd, Guangdong (CN)

(72) Inventors: Zhiyong Xiao, Guangdong (CN); Maofeng Shao, Guangdong (CN); Guoping Zhang, Guangdong (CN); Guangneng Wang, Guangdong (CN)

(73) Assignee: Shenzhen Han's Robot Co., Ltd, Shenzhen (CN)

( * ) Notice: Subject to any disclaimer, the term of this patent is extended or adjusted under 35 U.S.C. 154(b) by 0 days.

(21) Appl. No.: 18/407,358

(22) Filed: Jan. 8, 2024

(65) Prior Publication Data
US 2024/0342923 A1    Oct. 17, 2024

(30) Foreign Application Priority Data

Apr. 11, 2023    (CN) .......................... 202310379866.7

(51) Int. Cl.
*B25J 13/08*    (2006.01)
*B25J 9/12*    (2006.01)
*B25J 17/00*    (2006.01)

(52) U.S. Cl.
CPC ............. *B25J 13/088* (2013.01); *B25J 9/126* (2013.01); *B25J 17/00* (2013.01)

(58) Field of Classification Search
CPC . B25J 13/088; B25J 9/126; B25J 17/00; B25J 9/108; B25J 9/146
See application file for complete search history.

(56) References Cited

FOREIGN PATENT DOCUMENTS

| CN | 115870958 A | * | 3/2023 | .......... B25J 17/0241 |
|---|---|---|---|---|
| CN | 116394295 A | * | 7/2023 | |
| WO | WO-2023026432 A1 | * | 3/2023 | |

* cited by examiner

*Primary Examiner* — Zakaria Elahmadi (57) ABSTRACT

The disclosure provides a joint module and an articulated robot. The joint module comprises a hollow shaft having first and second ends, a speed reducer assembly and a motor assembly sleeved on the hollow shaft, and an encoder assembly. The power output end of the motor assembly is connected to the first end via the speed reducer assembly. The encoder assembly comprises an encoder mounting base, outer, middle, and inner rings, input and output code wheels disposed on the inner ring, and an encoder read head mounted on the encoder mounting base. The inner ring is sleeved on and connected with the second end. The middle ring connected with the power output end is sleeved on the inner ring in a running fit. The outer ring is sleeved on the middle ring in a running fit and connected with the motor assembly via the encoder mounting base.

9 Claims, 7 Drawing Sheets

JOINT MODULE AND ARTICULATED ROBOT

CROSS-REFERENCE TO PRIOR APPLICATION

This application claims the benefit of the priority of Chinese Patent Application No. 202310379866.7 filed on Apr. 11, 2023, the contents of which are incorporated herein by reference.

TECHNICAL FIELD

The disclosure relates to the technical field of robots, more particularly to a joint module and an articulated robot.

BACKGROUND

As an important industrial automation device, the articulated robot has drawn more and more attention and has been more and more widely used with the rapid development of industrial automation technology. Each degree of freedom of the articulated robot movement is performed by the joint module at each individual joint. The joint module has an integrated structure which integrates core components such as a motor assembly, an encoder assembly, and a speed reducer assembly. In the related art, the encoder assembly includes multiple components and has complicated assembly steps to assemble the multiple components in sequence during assembling.

SUMMARY

To this end, it is desired to provide a joint module which aims at the problem that the encoder assembly with multiple components has complicated assembly steps.

A joint module comprises:
  a hollow shaft having a first end and a second end oppositely arranged along an axial direction of the hollow shaft;
  a speed reducer assembly sleeved on the hollow shaft;
  a motor assembly sleeved on the hollow shaft in such a manner that a power output end of the motor assembly is connected to the first end via the speed reducer assembly; and
  an encoder assembly comprising an encoder mounting base, an outer ring, a middle ring, an inner ring, an input code wheel, an output code wheel, and an encoder read head, wherein the inner ring is sleeved on and connected to the second end, the middle ring is connected with the power output end and sleeved on the inner ring to provide a running fit there-between, the outer ring is sleeved on the middle ring to provide a running fit there-between, the outer ring is connected with the motor assembly via the encoder mounting base, the output code wheel is disposed on the inner ring, the input code wheel is disposed on the middle ring, and the encoder read head is mounted on the encoder mounting base.

In an implementation, the encoder assembly may further comprise a first rolling element disposed between the inner ring and the middle ring, and the inner ring and the middle ring may be in a running fit by the first rolling element.

In an implementation, the inner ring may be provided with a first raceway for receiving the first rolling element.

In an implementation, the inner ring may comprise a first connecting portion and a second connecting portion which are arranged along the axial direction of the hollow shaft, the first connecting portion may be located at a side of the second connecting portion proximal to the motor assembly, the first connecting portion and the second connecting portion may have an annular shape, a radial dimension of the first connecting portion may be greater than that of the second connecting portion, the first connecting portion may be provided with a first raceway on its outer circumferential surface, and the first connecting portion may have a first end surface in connection with the second connecting portion; and
  the first end surface may be provided with a first mounting boss extending along the axial direction, and an output code wheel may be sleeved on the first mounting boss in such a manner that a side wall of the output code wheel fits against the first end surface.

In an implementation, the middle ring may have an annular shape, the middle ring may have a second end surface facing away from the motor assembly, the second end surface may be provided with an accommodation cavity extending along the axial direction at a side proximal to the motor assembly, the first connecting portion may be disposed inside the accommodation cavity, and the accommodation cavity may have a wall provided with a second raceway for receiving the first rolling element.

In an implementation, an end cap may be further provided at a side of the encoder assembly facing away from the motor assembly, and the end cap may be covered on the second connecting portion and connected with the encoder mounting base;

A connecting element may be disposed between the end cap and the second connecting portion, and the end cap and the second connecting portion are in a running fit by the connecting element.

In an implementation, the encoder assembly may further comprise a second rolling element disposed between the middle ring and the outer ring, and the middle ring and the outer ring may be in a running fit by the second rolling element.

In an implementation, the middle ring may be provided with a third raceway extending along a circumferential direction of the middle ring to receive the second rolling element; and/or,
  the outer ring may be provided with a fourth raceway extending along a circumferential direction of the outer ring to receive the second rolling element.

In an implementation, the middle ring may have an annular shape, the middle ring may have a second end surface facing away from the motor assembly, the second end surface may be provided with a second mounting boss extending along the axial direction, and the input code wheel may be mounted on the second mounting boss in such a manner that a side wall of the input code wheel fits against the second end surface.

The disclosure further provides an articulated robot, comprising a housing and the joint module as mentioned above, and the joint module is mounted on the housing.

Due to the arrangement that both the speed reducer assembly and the motor assembly of said joint module are sleeved on the hollow shaft and the motor assembly is connected with the speed reducer assembly, as the power output end of the motor assembly is connected with the first end of the hollow shaft via the speed reducer assembly, the hollow shaft can rotate by the power output from the power output end of the motor assembly after speed reduction by means of the speed reducer assembly. As the inner ring of the encoder assembly is sleeved on the second end of the hollow shaft, after speed reduction by means of the speed reducer assembly, the power output from the power output end of the motor assembly can drive the hollow shaft and thus the inner ring to rotate, and thus drive the output code wheel mounted on the inner ring to rotate. Consequently, by means of the output code wheel, the rotation angle of the hollow shaft can be detected, and the number of revolutions of the hollow shaft can be recorded. As the middle ring is sleeved on the inner ring, the outer ring is sleeved on the middle ring, the outer ring is connected with the motor assembly via the encoder mounting base, and the middle ring is connected with the power output end, the power output end in such a case can drive the middle ring to rotate, and thus drive the input code wheel mounted on the middle ring to rotate. Consequently, by means of the input code wheel, the rotation angle of the power output end of the motor assembly can be detected, and the number of revolutions of the power output shaft can be recorded. As the middle ring is driven to rotate by the power output end without speed reduction by means of the speed reducer, the rotational speed of the middle ring is certainly greater than the rotational speed of the inner ring. As the encoder read head reads data of the output code wheel, the rotation angle and number of revolutions of the hollow shaft can be read. As the encoder read head reads data of the input code wheel, the rotation angle and number of revolutions of the power output end can be read. According to the joint module of the disclosure, the assembly of the inner ring, the middle ring, the outer ring, the input code wheel, the output code wheel, and the encoder read head of the encoder assembly can be performed all at once when the parts leave the factory. In order to assemble the encoder assembly and other parts of the joint module, it only needs to sleeve the inner ring on the second end of the hollow shaft and connect the inner ring with the second end, connect the encoder mounting base with the motor assembly, and connect the middle ring with the power output end of the motor assembly. In such a case, it simplifies the assembly procedure of the encoder assembly and improves assembly efficiency.

BRIEF DESCRIPTION OF THE DRAWINGS

FIG. 7 is a schematic view of an end cap according to an embodiment of the disclosure;
In the figures:
100. hollow shaft;
200. speed reducer assembly;
300. motor assembly;
400. encoder assembly; 410. encoder mounting base; 420. outer ring; 421. fourth raceway; 430. middle ring; 431. accommodation cavity; 432. second raceway; 433. third axial through hole; 434. third raceway; 435. second end surface; 436. second mounting boss; 440. inner ring; 441. first connecting portion; 442. second connecting portion; 443. first raceway; 444. first mounting boss; 445. first axial through hole; 446. second axial through hole; 447. first end surface; 450. input code wheel; 460. output code wheel; 470. encoder read head; 480. first rolling element; 490. second rolling element;
500. end cap; 510. connecting element;
600. brake device;
700. wires.

DETAILED DESCRIPTION OF ILLUSTRATED EMBODIMENTS

To make the above-mentioned purposes, features and advantages of the present disclosure more clear, particular embodiments of the present disclosure are described in detail below with reference to the accompanying drawings. In order to more fully understand the present invention, particular details are explained in the following description. However, the invention has other different implementations as well, and those skilled in the art can make modifications without departing from the concept of the present invention. Thus, the particular embodiments are not intended to limit the present invention.

It should be understood that the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential" as used in the description, refer to position and orientation relationships as shown in the drawings for convenience of description and for the purpose of simplicity. They are not intended to indicate or hint a limitation in terms of specific orientation or configuration and operation with specific orientation to the described device or element, and should not be regarded as a limitation to the present disclosure.

In addition, the terms "first" and "second" are used for convenience of description and are not intended to indicate or imply relative importance or hint the quantity of components. Hence, it should be understood that components defined by the terms "first" and "second" are intended to indicate or hint one or more of such components. Unless explicitly stated otherwise, it should be understood that the term "plurality" as used in the description refers to at least two, for example, two, or three.

It should be noted that, unless defined or specified otherwise, terms such as "mount", "connect", "attach", and "fix" used in the description are intended to have meanings commonly understood in a broad sense. For example, "connect" may refer to fixedly connect, or detachably connect, or integrally connect; or mechanically connect, or electrically connect; or directly connect, or indirectly connect via an intermedium, or internally communicate between two components, or interactive relationship between two components, unless specified otherwise. The meanings of the terms used herein may be understood by those skilled in the art in accordance with specific conditions.

Unless defined or specified otherwise, descriptions for example a first feature is located "above" or "below" a second feature as used in the description, may indicate that the first and second features are directly contacted with each other, or the first and second features are indirectly contacted via an intermedium. Furthermore, the description that the first feature is located "on", "above" or "over" the second feature may indicate that the first feature is located right above or obliquely above the second feature, or merely indicate that the first feature is located at a position higher than the second feature. The description that the first feature is located "under", "below" or "underneath" the second feature may indicate that the first feature is located right below or obliquely below the second feature, or merely indicate that the first feature is located at a position lower than the second feature.

It should be noted that, the description that a component is referred to as being "fixed" or "disposed" on another component may indicate that the component is directly arranged on the other component, or with a further component disposed there-between, and the description that a component is referred to as being "connect" to another component may indicate that the component is directly connect to the other component, or with a further component disposed there-between. The terms such as "vertical", "horizontal", "up", "down", "left", "right" and the like are used in the description for the purpose of description, and are not intended to limit the implementations.

As an important industrial automation device, the articulated robot has drawn more and more attention and has been more and more widely used with the rapid development of industrial automation technology. Each degree of freedom of the articulated robot movement is performed by the joint module at each individual joint. The joint module has an integrated structure which integrates core components such as a motor assembly, an encoder assembly, and a speed reducer assembly. In the related art, the encoder assembly includes multiple components. The encoder assembly may include an encoder mounting base, an inner ring, a middle ring, an input code wheel, an output code wheel, an encoder read head, a supporting element, etc. It has complicated assembly steps to assemble the multiple components in sequence during assembling.

Figure 1:
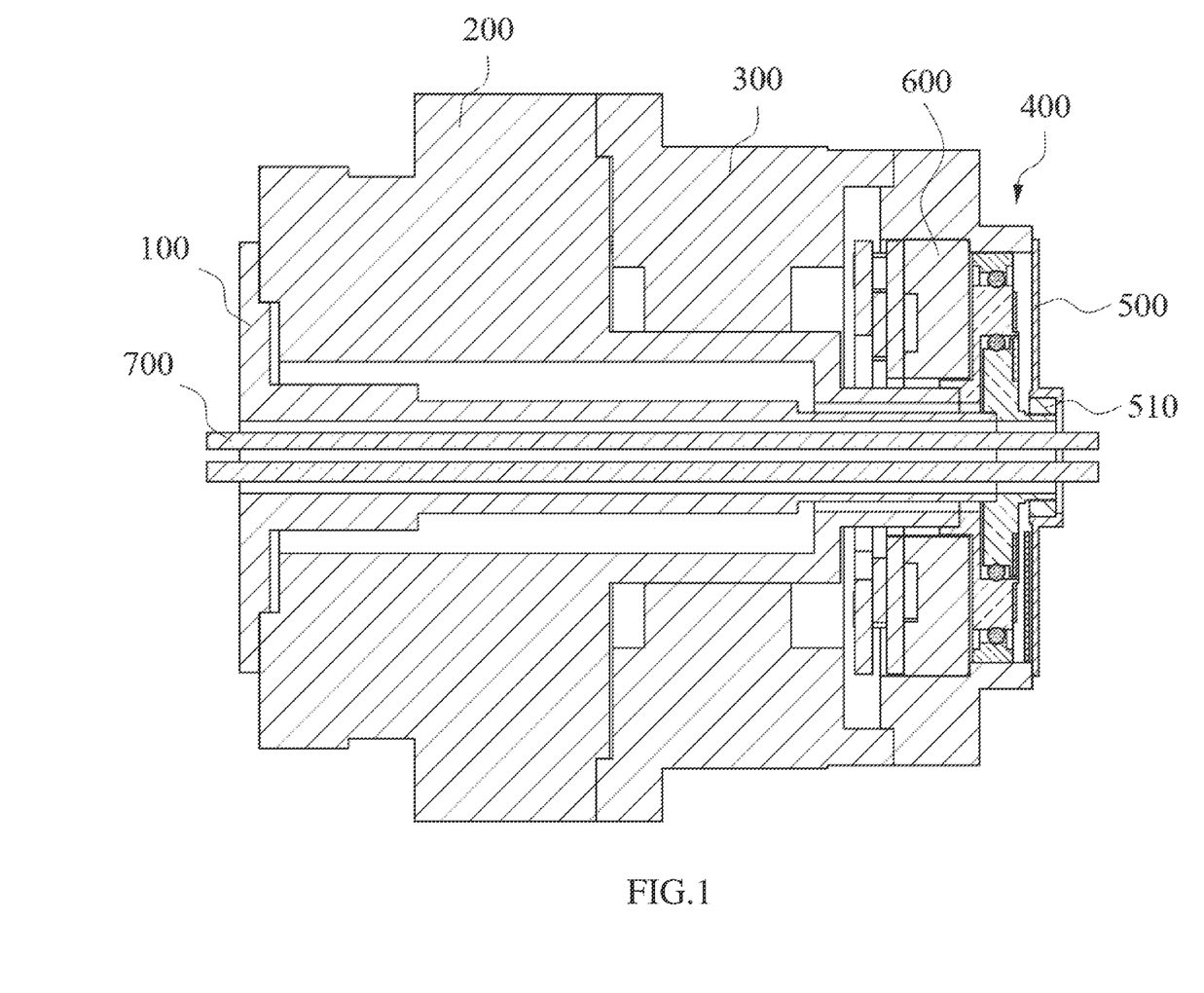
FIG. 1 is a cross-sectional view of a joint module according to an embodiment of the disclosure.
Figure 2:
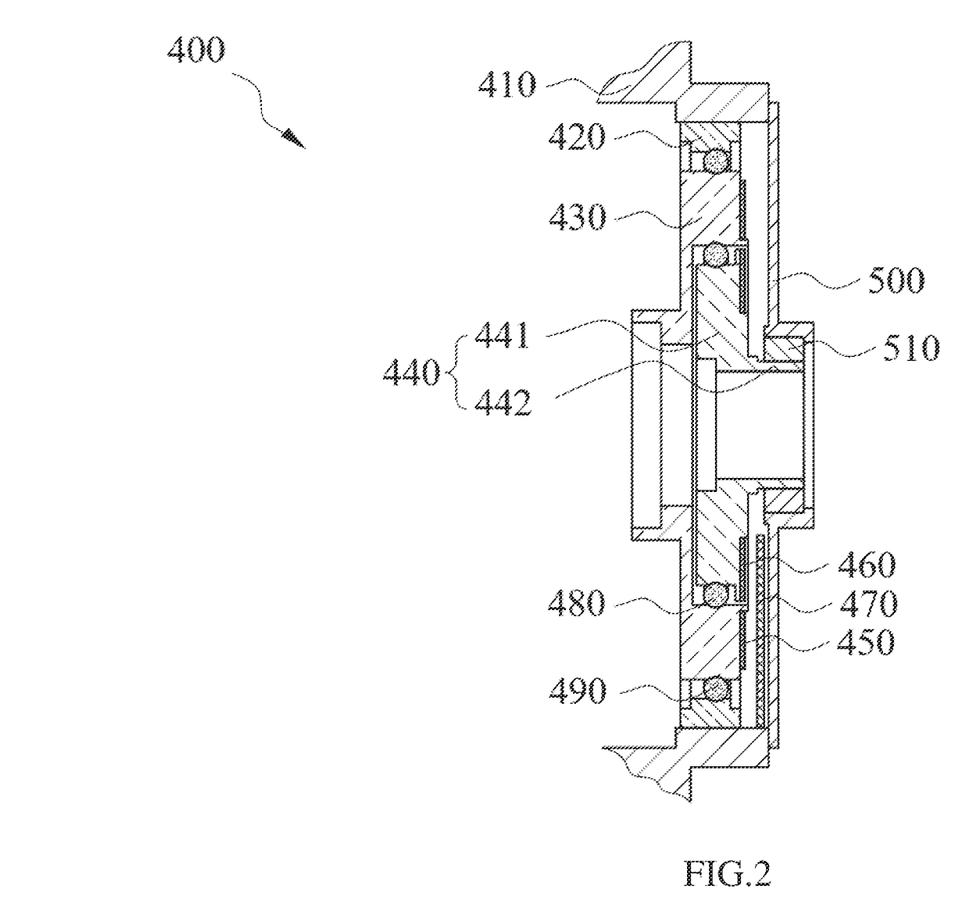
FIG. 2 is a cross-sectional view of an encoder assembly according to an embodiment of the disclosure.
Figure 3:
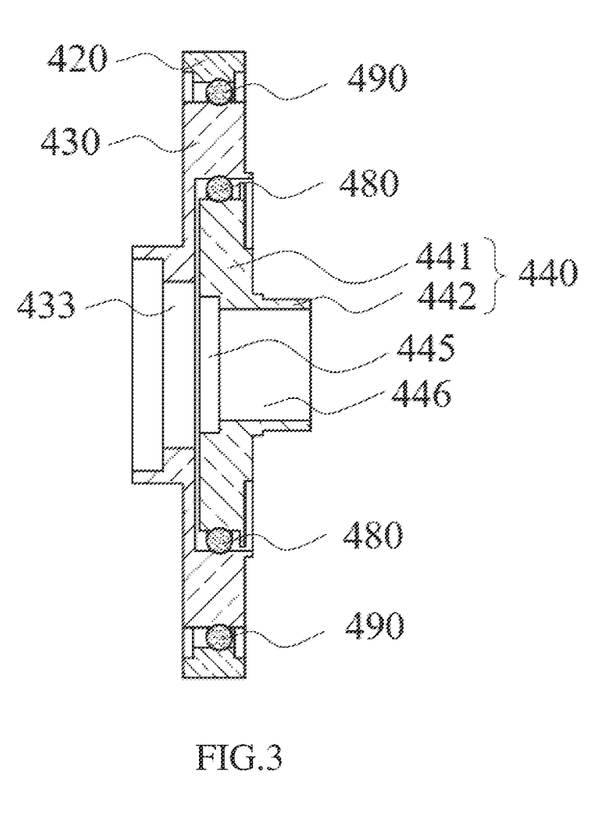
FIG. 3 is a cross-sectional view illustrating an inner ring, a middle ring, and an outer ring of an encoder assembly according to an embodiment of the disclosure.

The joint module is usually mounted in a housing and serves to drive the articulated robot to perform movements. In order to solve the problem that the encoder assembly with multiple components has complicated assembly steps, a joint module is provided. Referring to FIGS. 1-3, the joint module comprises a hollow shaft 100, a speed reducer assembly 200, a motor assembly 300, and an encoder assembly 400. Herein, the hollow shaft 100 has a first end and a second end oppositely arranged along its axial direction. The speed reducer assembly 200 is sleeved on the hollow shaft 100, and the motor assembly 300 is sleeved on the hollow shaft 100 in such a manner that the power output end of the motor assembly 300 is connected to the first end via the speed reducer assembly 200. The encoder assembly 400 comprises an encoder mounting base 410, an outer ring 420, a middle ring 430, an inner ring 440, an input code wheel 450, an output code wheel 460, and an encoder read head 470. Herein, the inner ring 440 is sleeved on and connected to the second end. The middle ring 430, which is connected with the power output end, is sleeved on the inner ring 440 to provide a running fit there-between. The outer ring 420 is sleeved on the middle ring 430 to provide a running fit there-between. The outer ring 420 is connected with the motor assembly 300 via the encoder mounting base 410. The output code wheel 460 is disposed on the inner ring 440, the input code wheel 450 is disposed on the middle ring 430, and the encoder read head 470 is mounted on the encoder mounting base 410.

Due to the arrangement that both the speed reducer assembly 200 and the motor assembly 300 of said joint module are sleeved on the hollow shaft 100 and the motor assembly 300 is connected with the speed reducer assembly 200, as the power output end of the motor assembly 300 is connected with the first end of the hollow shaft 100 via the speed reducer assembly 200, the hollow shaft 100 rotates by the power output from the power output end of the motor assembly 300 after speed reduction by means of the speed reducer assembly 200. As the inner ring 440 of the encoder assembly 400 is sleeved on the second end of the hollow shaft 100, after speed reduction by means of the speed reducer assembly 200, the power output from the power output end of the motor assembly 300 can drive the hollow shaft 100 and thus the inner ring 440 to rotate, and thus drive the output code wheel 460 mounted on the inner ring 440 to rotate. Consequently, by means of the output code wheel 460, the rotation angle of the hollow shaft 100 can be detected and displayed, and the number of revolutions of the hollow shaft 100 can be recorded. As the middle ring 430 is sleeved on the inner ring 440, the outer ring 420 is sleeved on the middle ring 430, the outer ring 420 is connected with the motor assembly 300 via the encoder mounting base, and the middle ring 430 is connected with the power output end, the power output end in such a case can drive the middle ring 430 to rotate, and thus drive the input code wheel 450 mounted on the middle ring 430 to rotate. Consequently, by means of the input code wheel 450, the rotation angle of the power output end of the motor assembly 300 can be detected, and the number of revolutions of the power output shaft can be recorded. As the middle ring 430 is driven to rotate by the power output end without speed reduction by means of the speed reducer, the rotational speed of the middle ring 430 is certainly greater than the rotational speed of the inner ring 440. As the encoder read head 470 reads the rotation angle data of the output code wheel 460, the rotation angle and number of revolutions of the hollow shaft 100 can be read. As the encoder read head 470 reads the rotation angle data of the input code wheel 450, the rotation angle and number of revolutions of the power output end can be read. According to the joint module of the disclosure, the assembly of the inner ring 440, the middle ring 430, the outer ring 420, the input code wheel 450, the output code wheel 460, and the encoder read head 470 of the encoder assembly 400 can be performed all at once when the parts leave the factory. In order to assemble the encoder assembly 400 and other parts of the joint module, it only needs to sleeve the inner ring 440 on the second end of the hollow shaft 100 and connect the inner ring 440 with the second end, connect the encoder mounting base with the motor assembly 300, and connect the middle ring 430 with the power output end of the motor assembly 300. In such a case, it simplifies the assembly procedure of the encoder assembly 400 and improves assembly efficiency.

Referring to FIG. 1, in a preferred embodiment, the joint module further comprises a brake device 600. The power output end of the motor assembly 300 is connected with the middle ring 430 of the encoder assembly 400 via the brake device 600. The brake device 600 serves to break the power output end.

Referring to FIG. 1, in a preferred embodiment, wires 700 connected with the power source are arranged to extend through the hollow shaft 100.

Referring to FIGS. 2 and 3, in some embodiments, the encoder assembly 400 further comprises a first rolling element 480 disposed between the inner ring 440 and the middle ring 430, and the inner ring 440 and the middle ring 430 are in a running fit by the first rolling element 480. The first rolling element 480 is arranged between the inner ring 440 and the middle ring 430 so as to provide a running fit between the inner ring 440 and the middle ring 430. In particular, the first rolling element 480 may be a ball roller, or a needle roller, or a cylindrical roller.

In a preferred embodiment, at two sides of the first rolling element 480 in the axial direction of the hollow shaft 100, side caps are provided, to store lubricating grease or lubricating oil required for the operation of the first rolling element 480.

Figure 4:
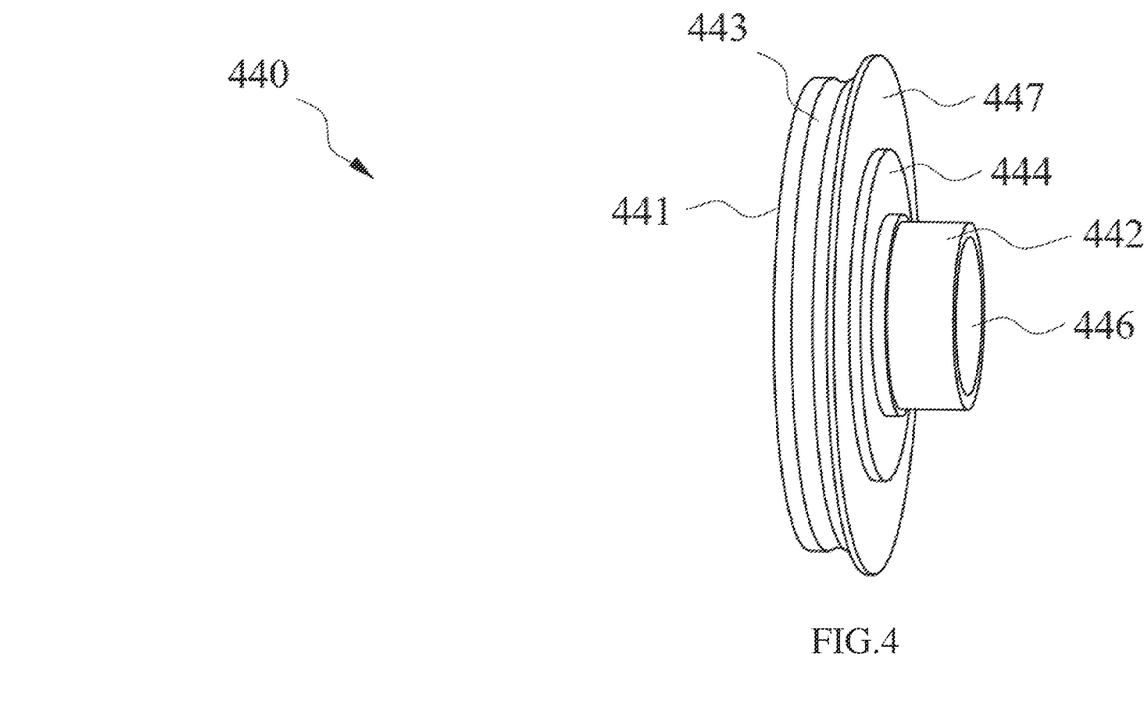
FIG. 4 is a schematic view of an inner ring according to an embodiment of the disclosure.

Referring to FIGS. 3 and 4, in some embodiments, the inner ring 440 is provided with a first raceway 443 for accommodating the first rolling element 480. The first raceway 443 provided on the inner ring 440 serves to receive the first rolling element 480.

In particular, referring to FIGS. 1, 3, and 4, the inner ring 440 comprises a first connecting portion 441 and a second connecting portion 442 which are arranged along the axial direction of the hollow shaft 100, and the first connecting portion 441 is located at a side of the second connecting portion 442 proximal to the motor assembly 300. The first connecting portion 441 and the second connecting portion 442 have an annular shape, and the radial dimension of the first connecting portion 441 is greater than that of the second connecting portion 442. The outer circumferential surface of the first connecting portion 441 is provided with a first raceway 443, and the first connecting portion 441 has a first end surface 447 in connection with the second connecting portion 442. The first end surface 447 is provided with a first mounting boss 444 extending along the axial direction, and an output code wheel 460 is sleeved on the first mounting boss 444 in such a manner that the side wall of the output code wheel 460 fits against the first end surface 447. The first raceway 443 provided on the outer circumferential surface of the first connecting portion 441 serves to receive the first rolling element 480. As the first end surface 447 of the first connecting portion 441 in connection with the second connecting portion 442 is provided with the first mounting boss 444, and the output code wheel 460 is sleeved on the first mounting boss 444 in such a manner that the side wall of the output code wheel 460 fits against the first end surface 447, the output code wheel 460 can be mounted.

More particularly, referring to FIGS. 1, 3, and 4, the first mounting boss 444 has an annular shape, and the radial dimension of the first mounting boss 444 is less than that of the first connecting portion 441 and greater than that of the second connecting portion 442.

In particular, referring to FIGS. 2-4, the first connecting portion 441 of the inner ring 440 is provided with a first axial through hole 445, the second connecting portion 442 of the inner ring 440 is provided with a second axial through hole 446 in communication with the first axial through hole 445, and the radial dimension of the first axial through hole 445 is greater than that of the second axial through hole 446. Both the first axial through hole 445 and the second axial through hole 446 serve to allow the hollow shaft 100 to extend through.

Referring to FIGS. 1, 2, 4, and 7, in some embodiments, the joint module further comprises an end cap 500 at a side of the encoder assembly 400 facing away from the motor assembly 300. The end cap 500 is covered on the second connecting portion 442 and is connected with the encoder mounting base 410. A connecting element 510 is disposed between the end cap 500 and the second connecting portion 442, and the end cap 500 and the second connecting portion 442 are in a running fit by the connecting element 510. As the end cap 500 is covered on the second connecting portion 442 and is connected with the encoder mounting base 410, an enclosed space can be formed between the end cap 500 and a side of the encoder assembly 400 facing away from the motor assembly 300. The end cap 500 is used to seal off the side of the encoder assembly 400 facing away from the motor assembly 300. In such a case, all the input code wheel 450, the output code wheel 460, and the encoder read head 470 are located inside the enclosed space. By using the end cap 500 to seal the input code wheel 450, the output code wheel 460, and the encoder read head 470, it prevents external dust from entering the input code wheel 450, the output code wheel 460, or the encoder read head 470 to affect the measurement accuracy of the input code wheel 450, the output code wheel 460, or the encoder read head 470. As the connecting element 510 is disposed between the end cap 500 and the second connecting portion 442, the end cap 500 and the second connecting portion 442 are in a running fit by the connecting element 510. In particular, the connecting element 510 may be a sliding bearing or a rolling bearing.

Referring to FIGS. 1, 3, and 4, in a preferred embodiment, the second connecting portion 442 of the inner ring 440 is provided with a shoulder, for limiting the position of the connecting element 510 in the axial direction.

Figure 5:
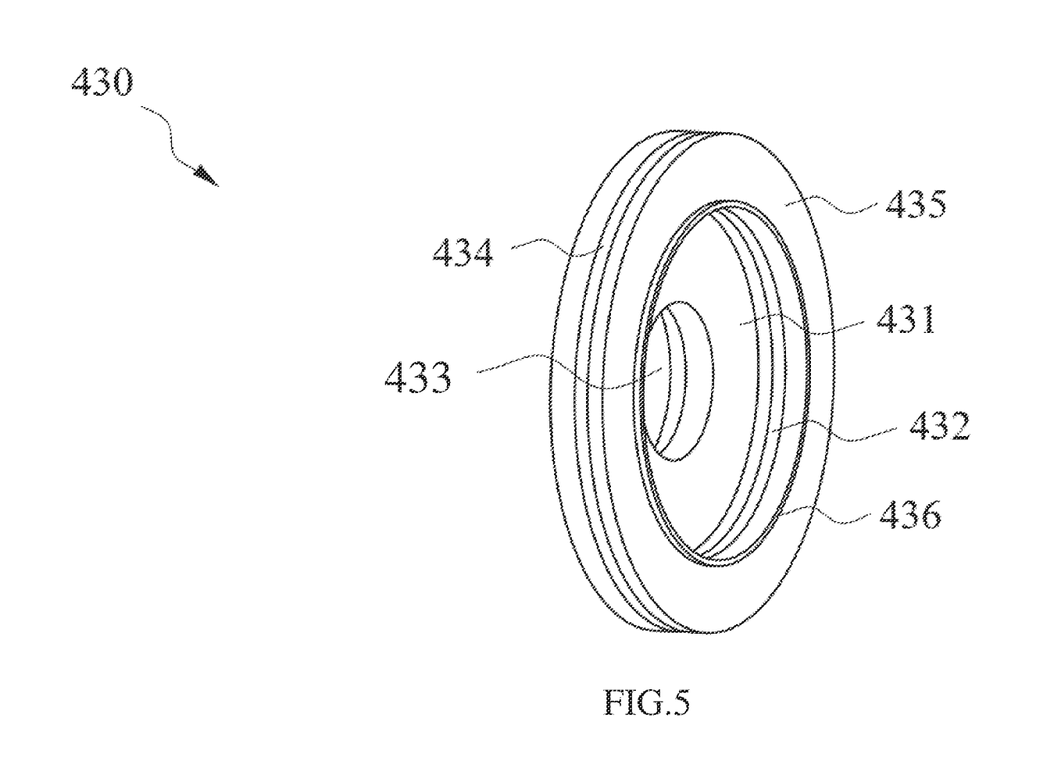
FIG. 5 is a schematic view of a middle ring according to an embodiment of the disclosure.

Referring to FIGS. 1, 3, and 5, in some embodiments, the middle ring 430 has an annular shape, the middle ring 430 has a second end surface 435 facing away from the motor assembly 300. An accommodation cavity 431 is provided on the second end surface 435, and the accommodation cavity 431 extends along the axial direction towards a side of the motor assembly 300. The first connecting portion 441 is disposed inside the accommodation cavity 431. The accommodation cavity 431 has a wall provided with a second raceway 432 for receiving the first rolling element 480. As the wall of the accommodation cavity 431 is provided with the second raceway 432, the first connecting portion 441 of the inner ring 440 can be inserted into the accommodation cavity 431 of the middle ring 430 in such a manner that the first rolling element 480 disposed in the first raceway 443 is partially disposed in the second raceway 432, such that the middle ring 430 and the inner ring 440 are in a running fit by the first rolling element 480.

In particular, when the first connecting portion 441 of the inner ring 440 is disposed into the accommodation cavity 431 of the middle ring 430, the first raceway 443 and the second raceway 432 are arranged at a distance in a direction perpendicular to the axial direction.

Referring to FIGS. 2, 3, and 5, in a preferred embodiment, the inner ring 440 is provided with a third axial through hole 433 in communication with the first axial through hole 445, and the radial dimension of the third axial through hole 433 is greater than the dimension of the first axial through hole 445. The third axial through hole 433 serves to allow the hollow shaft 100 to extend through.

In particular, referring to FIGS. 2, 3, and 5, the third axial through hole 433 is a stepped bore which has a bore diameter sequentially decreasing along the axial direction of the hollow shaft 100 in a direction towards the end cap 500.

Referring to FIGS. 2 and 3, in some embodiments, the encoder assembly 400 further comprises a second rolling element 490 disposed between the middle ring 430 and the outer ring 420, and the middle ring 430 and the outer ring 420 are in a running fit by the second rolling element 490. The second rolling element 490 is arranged between the middle ring 430 and the outer ring 420 so as to provide a running fit between the middle ring 430 and the outer ring 420. In particular, the second rolling element 490 may be a ball roller, or a needle roller, or a cylindrical roller.

In a preferred embodiment, at two sides of the second rolling element 490 in the axial direction of the hollow shaft 100, side caps are provided, to store lubricating grease or lubricating oil required for the operation of the second rolling element 490.

Referring to FIGS. 3 and 5, in some embodiments, the middle ring 430 is provided with a third raceway 434 extending along its circumferential direction. The third raceway 434 serves to accommodate the second rolling element 490. By using the third raceway 434 provided on the middle ring 430, the second rolling element 490 can be received.

Figure 6:
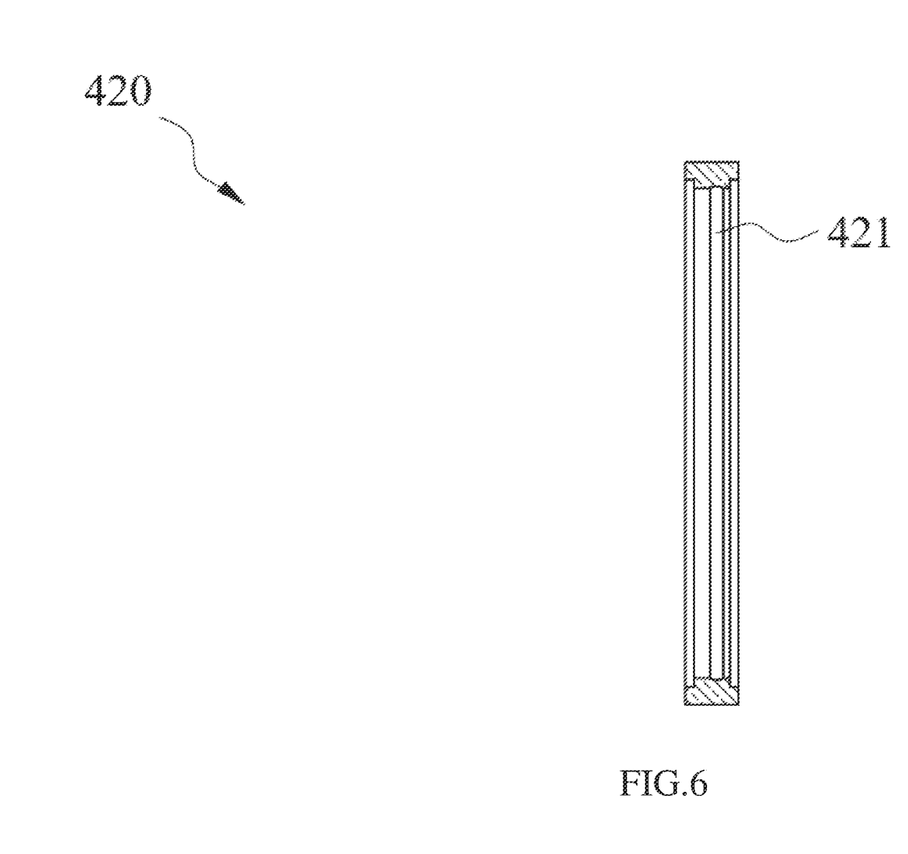
FIG. 6 is a schematic view of an outer ring according to an embodiment of the disclosure.
Figure 7:
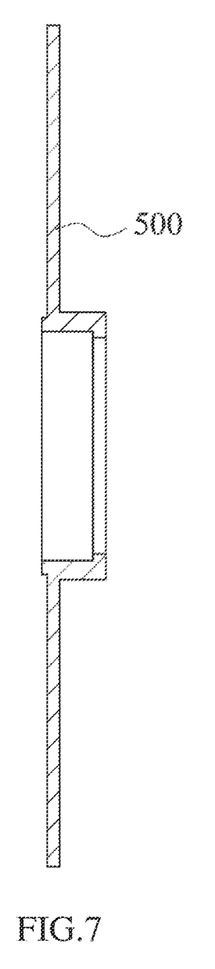

Referring to FIGS. 3 and 6, in some embodiments, the outer ring 420 is provided with a fourth raceway 421 extending along its circumferential direction. The fourth raceway 421 serves to accommodate the second rolling element 490. By using the fourth raceway 421 provided on the outer ring 420, the second rolling element 490 can be received.

Referring to FIGS. 3, 5, and 6, in some embodiments, the middle ring 430 is provided with a third raceway 434 extending along its circumferential direction and serving to accommodate the second rolling element 490, and the outer ring 420 is provided with the fourth raceway 421 extending along its circumferential direction and serving to accommodate the second rolling element 490. In such a case, the third raceway 434 and the fourth raceway 421 are used to collectively accommodate the second rolling element 490. In particular, when the outer ring 420 is sleeved on the middle ring 430, the third raceway 434 and the fourth raceway 421 are arranged at a distance in a direction perpendicular to the axial direction.

Referring to FIGS. 2 and 5, in some embodiments, the middle ring 430 has an annular shape, the middle ring 430 has a second end surface 435 facing away from the motor assembly 300, the second end surface 435 is provided with a second mounting boss 436 extending along the axial direction, the input code wheel 450 is mounted on the second mounting boss 436 in such a manner that the side wall of the input code wheel 450 fits against the second end surface 435. As the second mounting boss 436 is convexly provided on the second end surface 435, and the input code wheel 450 is sleeved on the second mounting boss 436 in such a manner that the side wall of the input code wheel 450 fits against the second end surface 435, the input code wheel 450 can be mounted.

In conclusion, referring to FIGS. 2, 3, and 5, the middle ring 430 has an annular shape, the middle ring 430 has a second end surface 435 facing away from the motor assembly 300, the accommodation cavity 431 is provided on the second end surface 435 and extends along the axial direction towards a side of the motor assembly 300, the first connecting portion 441 is disposed inside the accommodation cavity 431, the accommodation cavity 431 has a wall provided with a second raceway 432, the outer circumferential surface of the middle ring 430 is provided with the fourth raceway 421 extending along its circumferential direction, and the second mounting boss 436 extending along the axial direction is provided on the second end surface 435.

An articulated robot is further provided in the invention, which comprises a housing and the joint module as mentioned above, and the joint module is mounted on the housing. By using the joint module mounted in the housing, the articulated robot can be driven to perform movements.

The technical features of the above embodiments can be combined in any form, which are omitted for the purpose of simplicity. The invention is intended to cover all combinations provided that there is no contradiction.

All the above are merely some embodiments of the disclosure, which are described in particular details but are not to limit the scope of the disclosure in any form. It should be noted that those skilled in the art may obtain equivalents or modifications without departing from the concept of the disclosure. The invention is intended to cover all of the equivalents or modifications included. The scope of the present invention is defined by the appended claims.

The invention claimed is:

1. A joint module, characterized in that, the joint module comprises:
   a hollow shaft having a first end and a second end oppositely arranged along an axial direction of the hollow shaft;
   a speed reducer assembly sleeved on the hollow shaft;
   a motor assembly sleeved on the hollow shaft in such a manner that a power output end of the motor assembly is connected to the first end via the speed reducer assembly; and
   an encoder assembly comprising an encoder mounting base, an outer ring, a middle ring, an inner ring, an input code wheel, an output code wheel, and an encoder read head, wherein the inner ring is sleeved on and connected to the second end, the middle ring is connected with the power output end and sleeved on the inner ring, the middle ring and the inner ring are in a running fit, the outer ring is sleeved on the middle ring, the outer ring and the middle ring are in a running fit, the outer ring is connected with the motor assembly via the encoder mounting base, the output code wheel is disposed on the inner ring, the input code wheel is disposed on the middle ring, and the encoder read head is mounted on the encoder mounting base,
   the inner ring comprises a first connecting portion and a second connecting portion which are arranged along the axial direction of the hollow shaft, the first connecting portion is located at a side of the second connecting portion proximal to the motor assembly, the first connecting portion and the second connecting portion have an annular shape, a radial dimension of the first connecting portion is greater than that of the second connecting portion, an outer circumferential surface of the first connecting portion is provided with a first raceway, and the first connecting portion has a first end surface in connection with the second connecting portion; and
   the first end surface is provided with a first mounting boss extending along the axial direction, and an output code wheel is sleeved on the first mounting boss in such a manner that a side wall of the output code wheel fits against the first end surface.

2. The joint module according to claim 1, characterized in that the encoder assembly further comprises a first rolling element disposed between the inner ring and the middle ring, and the inner ring and the middle ring are in a running fit by the first rolling element.

3. The joint module according to claim 2, characterized in that the inner ring is provided with a first raceway for receiving the first rolling element.

4. The joint module according to claim 3, characterized in that the middle ring has an annular shape, the middle ring has a second end surface facing away from the motor assembly, the second end surface is provided with an accommodation cavity extending along the axial direction towards the motor assembly, the first connecting portion is disposed inside the accommodation cavity, and the accommodation cavity has a wall provided with a second raceway for receiving the first rolling element.

5. The joint module according to claim 1, characterized in that an end cap is further provided at a side of the encoder assembly facing away from the motor assembly, the end cap is covered on the second connecting portion and is connected with the encoder mounting base; and a connecting element is disposed between the end cap and the second connecting portion, and the end cap and the second connecting portion are in a running fit by the connecting element.

6. The joint module according to claim 1, characterized in that the encoder assembly further comprises a second rolling element disposed between the middle ring and the outer ring, and the middle ring and the outer ring are in a running fit by the second rolling element.

7. The joint module according to claim 6, characterized in that the middle ring is provided with a third raceway extending along a circumferential direction of the middle ring to receive the second rolling element; and/or, the outer ring is provided with a fourth raceway extending along a circumferential direction of the outer ring to receive the second rolling element.

8. The joint module according to claim 1, characterized in that the middle ring has an annular shape, the middle ring has a second end surface facing away from the motor assembly, the second end surface is provided with a second mounting boss extending along the axial direction, the input code wheel is mounted on the second mounting boss in such a manner that a side wall of the input code wheel fits against the second end surface.

9. An articulated robot, characterized in that the articulated robot comprises a housing and the joint module according to claim 1, and the joint module is mounted on the housing.

* * * * *